(12) United States Patent
Tang et al.

(10) Patent No.: US 10,337,663 B2
(45) Date of Patent: Jul. 2, 2019

(54) TWO-DEGREE-OF-FREEDOM ROTATION CONTROL DEVICE AND APPLICATION SYSTEM

(71) Applicant: BEIJING UNISTRONG SCIENCE & TECHNOLOGY CO., LTD., Beijing (CN)

(72) Inventors: Lizheng Tang, Beijing (CN); Di Zhang, Beijing (CN)

(73) Assignee: BEIJING UNISTRONG SCIENCE & TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/576,087

(22) PCT Filed: May 27, 2015

(86) PCT No.: PCT/CN2015/079920
§ 371 (c)(1),
(2) Date: Nov. 21, 2017

(87) PCT Pub. No.: WO2016/187837
PCT Pub. Date: Dec. 1, 2016

(65) Prior Publication Data
US 2018/0128416 A1 May 10, 2018

(51) Int. Cl.
*F16M 11/14* (2006.01)
*F16M 11/12* (2006.01)
(Continued)

(52) U.S. Cl.
CPC ............ *F16M 11/12* (2013.01); *F16C 11/06* (2013.01); *F16M 11/14* (2013.01); *F16M 11/18* (2013.01);
(Continued)

(58) Field of Classification Search
CPC ........ F16M 11/12; F16M 11/23; F16M 11/14; F16M 11/126; F16M 11/128; G01C 21/18;
(Continued)

(56) References Cited

U.S. PATENT DOCUMENTS 5,453,653 A * 9/1995 Zumeris .............. H01L 41/0913
310/315
6,820,531 B1 11/2004 Cianciolo
(Continued)

FOREIGN PATENT DOCUMENTS

| CN | 87102335 A | 11/1988 |
|---|---|---|
| CN | 2277094 Y | 3/1998 |

(Continued)

OTHER PUBLICATIONS

Chinese Office Action for Application No. 201510280742.9 dated Feb. 17, 2017.
(Continued)

*Primary Examiner* — Nkeisha Smith
(74) *Attorney, Agent, or Firm* — Wolf, Greenfield & Sacks, P.C.

(57) ABSTRACT

A two-degree-of-freedom rotation control device includes a rotary body having a friction spherical surface, wherein a load mounting platform is provided on a top of the rotating body or inside the rotating body; a fixing and supporting structure configured to hold the rotating body, to allow the rotating body to have only a rotational degree of freedom; and a driving motor, wherein, a driving end of the driving motor is in direct contact with the friction spherical surface of the rotating body, to form a friction transmission pair tangent to the friction spherical surface. An application
(Continued)

system has the two-degree-of-freedom rotation control device and a working unit on the two-degree-of-freedom rotation control device.

36 Claims, 4 Drawing Sheets

(51) Int. Cl.
　　*G01C 21/18*　　(2006.01)
　　*G05D 3/12*　　(2006.01)
　　*F16M 11/18*　　(2006.01)
　　*F16C 11/06*　　(2006.01)
　　*H02N 2/10*　　(2006.01)

(52) U.S. Cl.
　　CPC .............. *G01C 21/18* (2013.01); *G05D 3/12* (2013.01); *H02N 2/108* (2013.01)

(58) Field of Classification Search
　　CPC .......... G01C 21/00; G05D 3/12; G05D 3/125; H02N 2/108; H02N 2/003; H02N 2/103; H01L 41/0906
　　See application file for complete search history.

(56) References Cited

U.S. PATENT DOCUMENTS

| | | | |
|---|---|---|---|
| 2008/0106170 A1* | 5/2008 | Knowles | H01L 41/0993 310/328 |
| 2008/0238249 A1 | 10/2008 | Takahashi et al. | |
| 2009/0238668 A1 | 9/2009 | Grange et al. | |
| 2010/0207488 A1* | 8/2010 | Ting | H02N 2/108 310/323.06 |
| 2013/0151960 A1* | 6/2013 | Wiertlewski | G06F 3/015 715/702 |
| 2015/0162853 A1* | 6/2015 | Leroy | H01L 41/0906 310/323.02 |
| 2018/0051847 A1* | 2/2018 | Arginteanu | F16M 11/14 |

FOREIGN PATENT DOCUMENTS

| | | |
|---|---|---|
| CN | 1546951 A | 11/2004 |
| CN | 103744436 A | 4/2014 |
| CN | 103792957 A | 5/2014 |
| CN | 104440833 A | 3/2015 |
| CN | 104440836 A | 3/2015 |
| CN | 104850140 A | 8/2015 |
| CN | 204595622 U | 8/2015 |
| EP | 1 111 692 A2 | 6/2001 |
| EP | 1 870 790 A1 | 12/2007 |
| GB | 807555 A | 1/1959 |
| GB | 2 458 905 A | 10/2009 |
| JP | 10-6704 A | 1/1998 |

OTHER PUBLICATIONS

Chinese Office Action for Application No. 201510280742.9 dated Jul. 13, 2017.
Liu et al., Precision Workpiece Table Technology in Micro-Nano Machining. Press of Beijing University of Technology. Dec. 2004;86-7.
International Search Report and Written Opinion for International Application No. PCT/CN2015/079920 dated Feb. 15, 2016.
Extended European Search Report dated Sep. 17, 2018 in connection with European Application No. 15892918.2.

* cited by examiner

TWO-DEGREE-OF-FREEDOM ROTATION CONTROL DEVICE AND APPLICATION SYSTEM

CROSS-REFERENCE TO RELATED APPLICATIONS

The present application is the national phase of International Application No. PCT/CN2015/079920, titled "TWO-DEGREE-OF-FREEDOM ROTATION CONTROL DEVICE AND APPLICATION SYSTEM THEREWITH", filed on May 27, 2015, the entire disclosure of which is incorporated herein by reference.

FIELD

This application relates to the technical field of rotating devices, and in particular to a two-degree-of-freedom rotation control device. This application further relates to an application system having the two-degree-of-freedom rotation control device.

BACKGROUND

A two-degree-of-freedom rotation device and its application system are commonly used for achieving a stable platform and an automatically levelling device and so on, and are cores for achieving a driving and stabilizing device and method with three rotational degrees of freedom.

At present, the two-degree-of-freedom rotating device is mostly realized by two mutually orthogonal rotating gimbal frames. A motor and a sensor are respectively mounted at two ends of a rotating shaft of each of the gimbal frames, to achieve driving and rotation angle measurement. The exterior of the two-degree-of-freedom rotating device is supported and fixed with a frame.

Reference is made to FIG. 1 which is a schematic view showing the structure of a gimbal-type two-degree-of-freedom rotation control device.

As shown in the figure, two rectangular rotating gimbal frames 1' (spherical gimbal frames may also be used) are orthogonal to each other, and a driving motor 2' and an angle sensor 3' are respectively provided at two ends of each of two rotating drive shafts of the rotating gimbal frames 1'. The two rotating shafts are controlled and adjusted according to measurement data of the angle sensors 3', thereby achieving stable control of a stabilization platform 4'. The driving motor 2' is a conventional electromagnetic induction motor.

Since the two rotating shafts are required to be perpendicular and orthogonal to each other and the driving motors are required to be mounted at ends of the two shafts, this two-degree-of-freedom rotation control device has the following disadvantages.

Firstly, the gimbal frame form and the nested structure may cause the entire device to have a too large volume, which is not good for miniaturization of the entire device, causes the entire device to take up too much space and causes great difficulties in arrangement and assembly.

Secondly, although the two-degree-of-freedom rotation control device has a simple structure when viewed from the principle diagram, in actual manufacturing process, in order to ensure the two rotating shafts to be precisely perpendicular and orthogonal to each other, the mechanical structure of the two-degree-of-freedom rotation control device may be very complex and has very high precision requirements in processing, assembling and adjusting processes, which causes the device to have a high cost.

Thirdly, the gimbal frame structure causes the entire device to have a poor rigidity and an unstable performance.

SUMMARY

A first object of the present application is to provide a two-degree-of-freedom rotation control device. The device has a simple structure, a low cost and a stable performance, and is apt to be miniaturized, and has a wide range of dynamic response and a low power consumption, and can be widely applied to various dynamic stabilization platforms and automatic static orienting/levelling devices.

A second object of the present application is to provide an application system having the two-degree-of-freedom rotation control device.

In order to achieve the first object, a two-degree-of-freedom rotation control device is provided according to the present application which includes:

a rotating body having a friction spherical surface, wherein a load mounting platform is provided on a top of the rotating body or inside the rotating body;

a fixing and supporting structure configured to hold the rotating body, to allow the rotating body to have only a rotational degree of freedom; and a driving motor, wherein, a driving end of the driving motor is in direct contact with the friction spherical surface of the rotating body, to form a friction transmission pair tangent to the friction spherical surface.

Preferably, there are four driving motors distributed uniformly at a periphery of the rotating body at equal phase angles of 90 degrees, and gyroscopic moments of friction transmission pairs of every two opposed driving motors have opposite directions.

Preferably, there are two driving motors with a phase angle of 90 degrees, and each of the two driving motors is provided with a rotating support member at another side, opposed to the driving motor, of the rotating body.

Preferably, the driving motor is a standing wave type piezoelectric ceramic motor.

Preferably, each of the driving motors is arranged longitudinally at a periphery of the rotating body.

Preferably, the two-degree-of-freedom rotation control device further includes:

a detection unit configured to acquire attitude data of the rotating body and transmit the attitude data to a control unit; and the control unit configured to receive the attitude data measured by the detection unit and to control and adjust rotation of the rotating body in two rotational degrees of freedom according to data including the attitude data.

Preferably, the rotating body is a complete spherical rotating body, a partial spherical rotating body or a virtual spherical rotating body with a plurality of local spherical surfaces.

Preferably, the rotating body is a ceramic or metallic rotating body.

Preferably, the fixing and supporting structure includes:

a base having a spherical concaved seat for accommodating the rotating body;

a lower support member provided at a bottom of a spherical space of the spherical concaved seat, and configured to support the rotating body to allow the rotating body to have a rotational degree of freedom; and an upper pressing block arranged on a top of the spherical concaved seat, and configured to hold the rotating body on the lower support member.

Preferably, the lower support member is a lower support ring which has an annular band-shaped inner spherical surface configured to support the rotating body; alternatively, the lower support member includes a plurality of support blocks distributed annularly and the support blocks have local inner spherical surfaces configured to support the rotating body.

Preferably, the lower support ring or the support blocks are made from a solid lubricating material.

Preferably, the upper pressing block is made from a solid lubricating material.

Preferably, the spherical concaved seat is in a shape of an upwardly-opened hollow hemisphere, an outer side of the spherical concaved seat has a local plane surface, and grooves are opened in the local plane surface to form driving motor mounting positions, and a special shaped pillar is formed between the adjacent grooves, and the upper pressing block is mounted at a top of the special shaped pillar.

Preferably, the driving end of the driving motor is in direct contact with the friction spherical surface of the rotating body on an equatorial plane or at a position of any horizontal section of the rotating body.

In order to achieve the second object described above, an application system is provided according to the present application which includes a rotating device and a working unit on the rotating device. The rotating device is a two-degree-of-freedom rotation control device according to any one of the above aspects, and the working unit is provided at the load mounting platform of the rotating body.

In the present application, the standing wave type piezoelectric ceramic motor is employed as the driving motor, and the driving end of the standing wave type piezoelectric ceramic motor is in direct contact with the friction spherical surface of the rotating body to transfer force and moment. In operation, the driving end of the standing wave type piezoelectric ceramic motor can transfer the force directly to the rotating body in a form of friction at an ultrasonic working frequency and a nanoscale amplitude, to form driving moments for rotating the rotating body in different directions. Each driving motor or each set of driving motors correspond to a rotational degree of freedom in one direction. Through the angle detection unit and the control unit, orientation and stability of the rotating body in two rotational degrees of freedom can be finally controlled and adjusted.

Based on the above technical solutions, the present application has the following beneficial effects.

1) Rotation in two degrees of freedom is realized by using only one rotating body, and the structure is simple. It is very easy to allow the two rotating shafts to orthogonal to each other by adjusting an installation position of the piezoelectric ceramic motor, and thus the cost will be reduced significantly.

2) With finish machining of the friction spherical surface of the rotating body, the roughness (nanoscale) of the surface of the rotating body and a good sphericity can be ensured with a low cost, and with the ultrasonic stimulation frequency and the nanoscale amplitude of the piezoelectric ceramic motor, a very high rotation accuracy can be achieved in both the two rotational degrees of freedom.

3) The piezoelectric ceramic motor applies the driving moment directly to the surface of the rotating body. The spherical structure or the spherical-like structure of the rotating body has an extremely high rigidity, thus the rotating body can obtain an extremely high dynamic performance. In a case that it is not required to drive the rotating body to rotate, a self-locking characteristic of the standing wave-type piezoelectric ceramic motor can maintain the attitude of the rotating body stable without consuming energy, thus the whole device has an extremely high energy efficiency.

4) It is easy to realize precise coupling processing of the rotating body with members such as the base. Portions of the fixing and supporting structure in contact with the rotating body are made from a solid lubricating material, which can ensure the fitting accuracy between the fixing and supporting structure and the rotating body to be equal to or less than 0.5 um. Furthermore, by a nanoscale high-frequency small-step feeding movement of the piezoelectric ceramic motor, high-speed precise rotational motion of the rotating body can be achieved.

5) The two-degree-of-freedom rotation control device using the piezoelectric ceramic motor and the rotating body can be designed to have a small size while meeting requirements of a high precision and a large load, which facilitates development of the final product towards miniaturization.

The application system according to the present application is provided with the above two-degree-of-freedom rotation control device. As the two-degree-of-freedom rotation control device has the technical effects described above, the application system provided with the two-degree-of-freedom rotation control device should also have the corresponding technical effects.

REFERENCE NUMERALS IN FIG. 1

Figure 1:
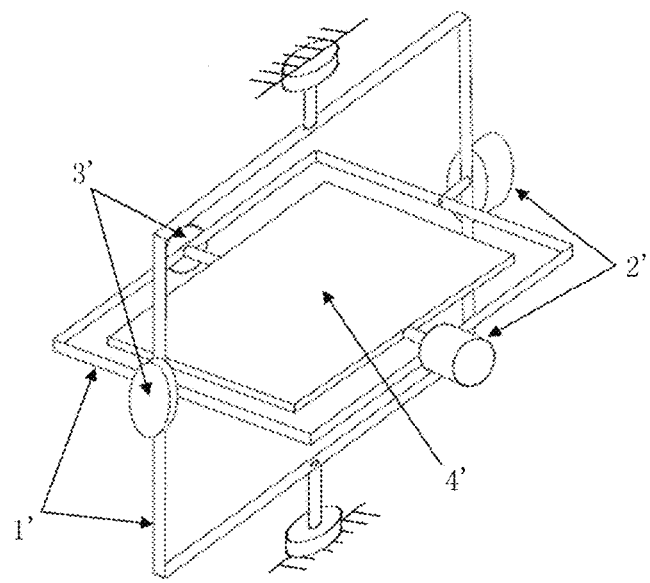
FIG. 1 is a schematic view showing the structure of a gimbal frame-type two-degree-of-freedom rotation control device in the conventional technology.

| 1' | rotating gimbal frame, | 2' | driving motor, |
| --- | --- | --- | --- |
| 3' | angle sensor, | 4' | stabilization platform. |

REFERENCE NUMERALS IN FIGS. 2 TO 5

| 1 | rotating body, | 1-1 | local spherical surface, |
| --- | --- | --- | --- |
| 2 | spherical concaved seat, | 3 | base, |
| 4 | lower support ring, | 5 | upper pressing block, |
| 6 | angle sensor, | 7 | driving motor, |
| 8 | motor mounting plate, | 9 | sensor connecting and mounting plate. |

DETAILED DESCRIPTION OF EMBODIMENTS

In order to make the person skilled in the art to have a better understanding of the solution of the present application, the present application is further described hereinafter in detail in conjunction with the drawings and embodiments.

Figure 2:
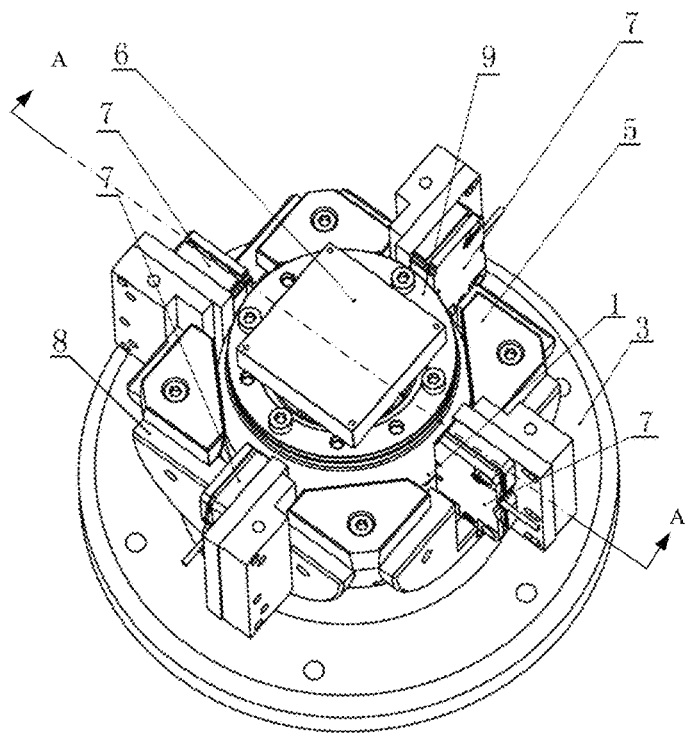
FIG. 2 is a schematic view showing the structure of an embodiment of a two-degree-of-freedom rotation control device according to the present application.

Reference is made to FIG. 2 which is a schematic view showing the structure of an embodiment of a two-degree-of-freedom rotation control device according to the present application.

According to an embodiment of the present application, the two-degree-of-freedom rotation control device mainly includes a rotating body 1, a base 3 provided with a spherical concaved seat 2, a lower support ring 4, an upper pressing block 5, an angle sensor 6, a driving motor 7 and a control unit.

Figure 3:
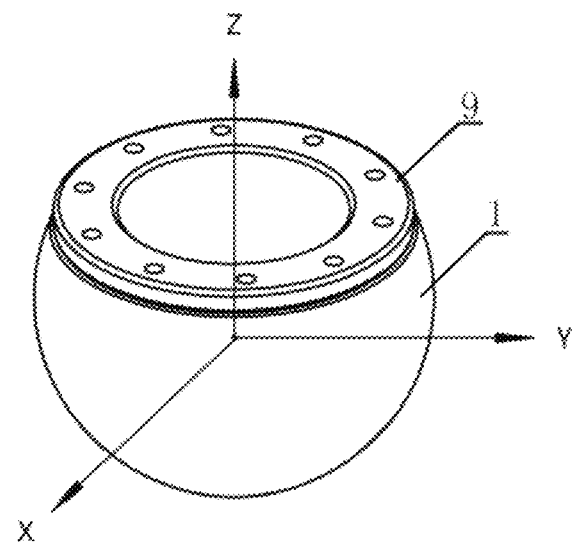
FIG. 3 is a schematic view showing the structure of a ceramic spherical rotating body shown in FIG. 2.

The rotating body 1 is a partially spherical rotating body made from ceramic or metallic material (see FIG. 3), and is formed by machining a top portion of a complete sphere to form a plane surface. The rotating body 1 may be hollow. Other components may be mounted at the top of the rotating body 1 or inside the rotating body 1. A load mounting platform may be located either inside the rotating body 1 or at the top of the rotating body 1. Except for the top surface of the rotating body 1, the remaining portion of the rotating body 1 is a spherical surface, that is, a friction spherical surface. By surface finishing, the friction spherical surface may achieve a nanoscale roughness.

Figure 4:
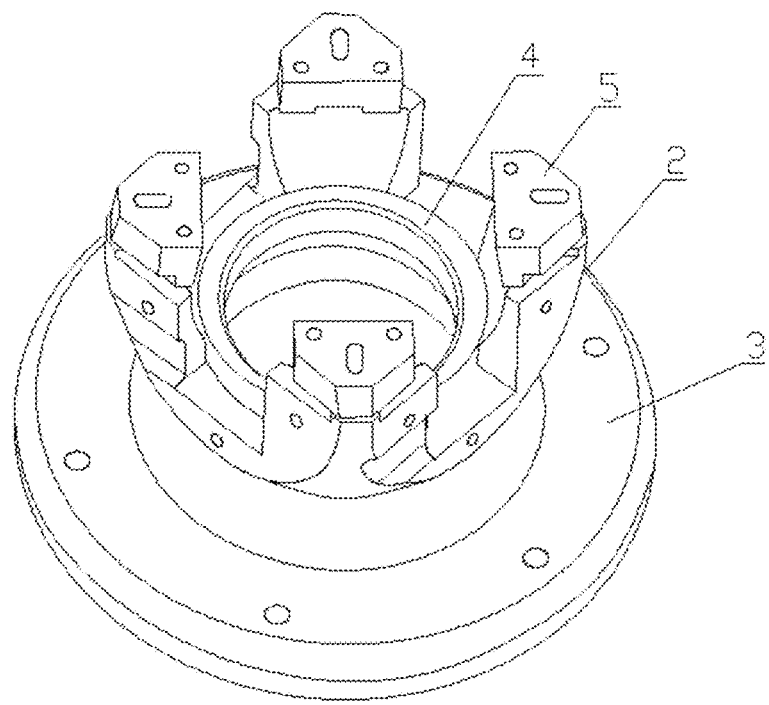
FIG. 4 is a schematic view showing the structure of a base and a spherical concaved seat shown in FIG. 2.

Reference is made to FIG. 4 which is a schematic view showing the structure of the base and the spherical concaved seat shown in FIG. 2.

The base 3 is in the shape of a disk, and is provided with the spherical concaved seat 2 at a center of the base 3, and the spherical concaved seat 2 is configured to accommodate the rotating body. The spherical concaved seat 2 is in the shape of an upwardly opened hollow hemisphere, and has a top surface located below an equatorial plane, to enable smooth placement of the rotating body 1 into the spherical concaved seat 2. An outer side surface of the spherical concaved seat 2 is cut in a longitudinal direction to form four local plane surfaces distributed evenly in a circumferential direction of the spherical concaved seat 2, and a U-shaped groove is opened in each of the local plane surfaces to form a driving motor mounting position. A special shaped pillar is formed between the adjacent U-shaped grooves.

The spherical concaved seat 2 is a single integral structure, and may be formed by precisely processing at one time. Compared with an assembled structure of individual parts, the spherical concaved seat 2 has a simple structure and a stable performance and is apt to be mounted and adjusted, and can ensure two rotation shafts to be precisely orthogonal to each other, thereby reducing the cost significantly.

The lower support ring 4 is mounted at a bottom of a spherical space of the spherical concaved seat 2. The lower support ring 4 has an annular band-shaped inner spherical surface configured to support the rotating body 1 to allow the rotating body 1 to rotate around three rotation axes of a stereoscopic space, that is, an X axis, a Y axis and a Z axis shown in FIG. 3. Any rotational movement of the rotating body 1 can be decomposed into rotations around the X axis, the Y axis and the Z axis. Although the rotating body 1 may rotate freely in the spherical concaved seat 2, the rotating body 1 cannot displace along the X axis, the Y axis or the Z axis, that is, the rotating body 1 only has rotational degrees of freedom with respect to the spherical concaved seat 2.

The upper pressing block 5 has a shape substantially matching the shape of a top surface of the special shaped pillar. The four upper pressing blocks 5 are respectively fixed to top portions of the four special shaped pillars to retain the rotating body 1 on the lower support ring 4. A part of the upper pressing block 5 in contact with the rotating body 1 is at a position above an equatorial plane of the rotating body 1 to retain the rotating body 1 on the lower support ring 4, thereby preventing the rotating body 1 from coming out of the spherical concaved seat 2.

The lower support ring 4 and the upper pressing blocks 5 are made from a solid lubricating material, for example, a PTFE (polytetrafluoroethylene) or PEEK (polyether ether ketone) material may be used. In this embodiment, a polytetrafluoroethylene material is used.

In the case that the upper pressing block 5 is not made from the solid lubricating material, in order to prevent a great frictional force from being generated between the upper pressing block 5 and the rotating body 1 which will accordingly affect rotation of the rotating body 1, an anti-friction pad or an anti-friction layer may be provided at the part of the upper pressing block 5 in contact with the rotating body 1, and the anti-friction pad or the anti-friction layer is fixed to the upper pressing block 5.

Figure 6:
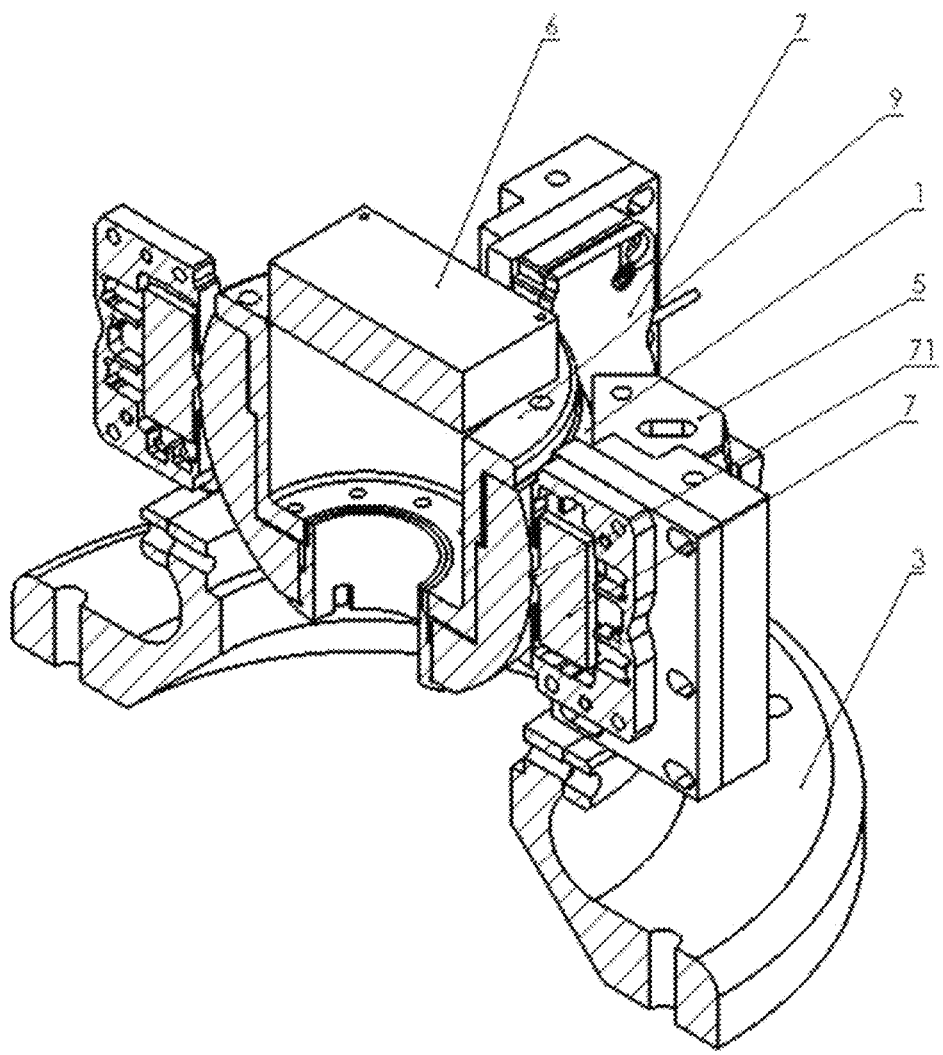
FIG. 6 is a sectional view of FIG. 2 taken along line A-A.

The driving motor 7 is a standing wave type piezoelectric ceramic motor. There are four driving motors 7, two of which are symmetrically arranged at two sides of the rotating body 1 in a direction of the X axis in an opposed manner and the other two of which are symmetrically arranged at two sides of the rotating body 1 in a direction of the Y axis in an opposed manner. The four driving motors 7 are distributed uniformly around the rotating body 1 and arranged longitudinally, and a phase angle of 90 degrees is formed between every two adjacent driving motors 7. A driving end of each of the driving motors 7 is a linear driving end 71, that is, each of the driving motors 7 can only perform linear drive. As shown in FIG. 6, the linear driving end 71 of the driving motor 7 is in direct contact with the friction spherical surface of the rotating body 1 to form a friction transmission pair tangent to the friction spherical surface. The friction transmission pairs of the two driving motors 7 in the same direction have gyroscopic moments with opposite directions. The two driving motors 7 in the direction of the X axis are configured to drive the rotating body 1 simultaneously to allow the rotating body 1 to rotate around the Y axis. The two driving motors 7 in the direction of the Y axis are configured to drive the rotating body 1 simultaneously to allow the rotating body 1 to rotate around the X axis.

Specifically, the driving motors 7 may be fixed at respective driving motor mounting positions of the spherical concaved seat 2 by respective motor mounting plates 8 shown in FIG. 2.

Since the linear driving end of the driving motor 7 is a ceramic head, the rotating body 1 is also preferably embodied as a ceramic rotating body, to form an ideal friction working pair between the linear driving end and the rotating body 1.

The angle sensor 6 is a MEMS angle sensor. Specifically, a MEMS gyroscope or a MEMS accelerometer may be used. The angle sensor 6 is mounted on the plane surface of the top portion of the rotating body 1 by a sensor connecting and mounting plate 9, and is configured to detect attitude data of the rotating body 1 in real time, and transmit the data to the control unit, and in turn the control unit controls and adjusts orientation and stability of the rotating body 1 in two rotational degrees of freedom (a rotational degree of freedom around the X axis and a rotational degree of freedom around the Y axis) according to the measured attitude data.

The orientation here refers to that the rotating body 1 and the load thereon are always directed to or aligned with a particular direction or a particular object. The stability here refers to that the rotating body 1 and the load thereon are always maintained in a set attitude, for example, the top surface of the rotating body 1 is always maintained horizontal.

Of course, the angle sensor 6 may alternatively be placed inside the spherical rotating body 1. Whether the angle sensor is arranged inside or outside the rotating body 1, the angle sensor can be supplied with power wirelessly and can transmit measurement data wirelessly.

In operation, the driving motor 7 transfers force or moment through the friction between a piezoelectric motor ceramic head and the surface of the ceramic spherical rotating body 1. The ceramic head of the driving motor 7 transfers the force directly to the surface of the ceramic spherical rotating body 1 in a form of friction at an ultrasonic working frequency and a nanoscale amplitude, to form driving moments for rotation around the X axis and the Y axis.

The two driving motors 7 mounted longitudinally at two ends of the Y axis are stimulated reversely, to apply a moment for rotation around the X axis on the ceramic spherical rotating body 1, and the other pair of driving motors 7 are stimulated reversely to apply a moment for rotation around the Y axis on the ceramic spherical rotating body 1, thus realizing the driving with two rotational degrees of freedom around the X axis and the Y axis.

Here, only a specific embodiment of the present application is given, in which, the driving with two rotational degrees of freedom around the X axis and the Y axis can be achieved. However, since the rotating body 1 is a partial spherical body, the rotating body 1 cannot rotate continuously. For this reason, the rotating body 1 may be designed as a complete spherical ceramic rotating body, the angle sensor 6 and other components are placed inside the ceramic spherical rotating body 1, and power supply and measurement data transmission are implemented in a wireless manner and thus an unconstrained stable driving for continuous rotation around the X axis and the Y axis is achieved. For an application with a small rotation range, the rotating body 1 may be designed as a virtual spherical rotating body having multiple local spherical surfaces.

Figure 5:
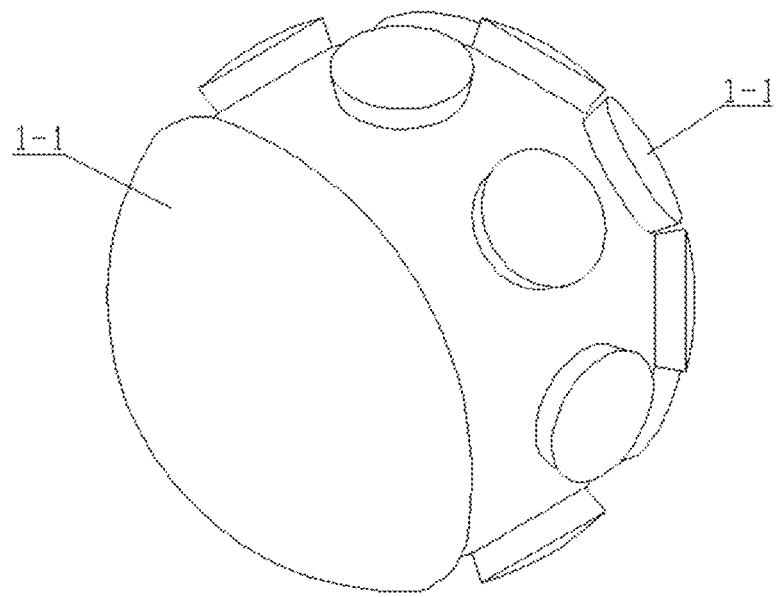
FIG. 5 is an exemplary view of a virtual spherical rotating body.

As shown in FIG. 5, the virtual spherical rotating body refers to a rotating body which has multiple local spherical surfaces 1-1 on the same complete spherical surface and does not exhibit a conventional spherical shape.

The four driving motors 7 of the above embodiment are mounted longitudinally on the equatorial plane of the spherical rotating body 1, and are distributed at two ends of the X axis and at two ends of the Y axis. For an application with a low requirement for response speeds of stabilization and levelling, only one driving motor 7 may be provided at each of the X and Y axes of the rotating body 1, and another end of each of the X and Y axes of the rotating body 1 is provided with a rotating support member opposed to the respective driving motor 7.

In addition, for special applications, instead of being mounted longitudinally on the equatorial plane of the spherical rotating body 1, the driving motor 7 is mounted longitudinally at a position tangent to any horizontal section of the spherical rotating body 1.

The above description is only preferred solutions of the two-degree-of-freedom rotation control device according to the present application, and the present application is not limited to this, and on the basis of the preferred solutions, targeted adjustments may be made according to actual requirements, and thus different embodiments are obtained. For example, the lower support ring 4 may be replaced with several support blocks distributed annularly, and the support blocks are configured to support the rotating body 1 through local inner spherical surfaces thereof; or, the number of the driving motors 7 may be further increased or reduced and may be three, five, six or more, and the driving motors 7 may be distributed at equal phase angles or unequal phase angles. There are many possible implementations, which will not be listed here.

The present application utilizes the combination of the piezoelectric ceramic motor having a friction transmission characteristic and the rotating body having the friction spherical surface, to realize the stable driving for a two-degree-of-freedom rotation by means of the MEMS sensor, and to always maintain the load at a horizontal position or at other particular orientations stably. On the basis of the two-degree-of-freedom rotation control device, a single sphere triaxial rotating device may be formed by fixing the base 3 of the two-degree-of-freedom rotation control device to a rotation axis in the direction of a Z axis, or by adding a rotation axis in the direction of a Z axis in the spherical rotating body 1, thus realizing control in three rotational degrees of freedom and further expanding the scope of application.

In addition to the above two-degree-of-freedom rotation control device, an application system is also provided according to the present application which includes a driving device and a working unit provided on the driving device. The driving device is the two-degree-of-freedom rotation control device described above, and the working unit is provided at the load mounting platform of the rotating body. The application system is applicable for a navigation system in high-speed flying or running apparatuses, such as an aircraft, a high-speed train and a motor vehicle, or a precisely-operating system in devices for measuring, testing, videoing and so on, to achieve orientation specifying, aligning, calibrating, tracking functions and other functions. The remaining structures of the application system may refer to the conventional technology, which will not be described herein.

The two-degree-of-freedom rotation control device and the application system according to the present application are described in detail hereinbefore. The principle and the embodiments of the present application are illustrated herein by specific examples. The above description of examples is only intended to help the understanding of the core concept of the present application. It should be noted that, for the person skilled in the art, a few of improvements and modifications may be further made to the present application without departing from the principle of the present application, and these improvements and modifications are also deemed to fall into the scope of protection of the present application defined by the claims.

The invention claimed is:

1. A two-degree-of-freedom rotation control device, comprising:
   a rotating body having a friction spherical surface, wherein a load mounting platform is provided on a top of the rotating body or inside the rotating body;
   a fixing and supporting structure configured to hold the rotating body, to allow the rotating body to have only rotational degrees of freedom; and
   driving motors, wherein each of the driving motors has a linear driving end, and the linear driving end of each of the driving motors is in direct contact with the friction spherical surface of the rotating body, to allow the linear driving end and the rotating body to form a friction transmission pair tangent to the friction spherical surface; and wherein there are four driving motors distributed uniformly at a periphery of the rotating body at equal phase angles of 90 degrees, and gyroscopic moments of friction transmission pairs of every two opposed driving motors have opposite directions.

2. The two-degree-of-freedom rotation control device according to claim 1, wherein each of the driving motors is a standing wave type piezoelectric ceramic motor.

3. The two-degree-of-freedom rotation control device according to claim 2, wherein the linear driving end of each of the driving motors is in direct contact with the friction spherical surface of the rotating body on an equatorial plane or at a position of any horizontal section of the rotating body.

4. The two-degree-of-freedom rotation control device according to claim 1, wherein each of the driving motors is arranged longitudinally at a periphery of the rotating body.

5. The two-degree-of-freedom rotation control device according to claim 1, further comprising:
a detection unit configured to acquire attitude data of the rotating body and transmit the attitude data to a control unit; and
the control unit configured to receive the attitude data measured by the detection unit and to control and adjust rotation of the rotating body in two rotational degrees of freedom according to data comprising the attitude data.

6. The two-degree-of-freedom rotation control device according to claim 5, wherein the linear driving end of each of the driving motors is in direct contact with the friction spherical surface of the rotating body on an equatorial plane or at a position of any horizontal section of the rotating body.

7. The two-degree-of-freedom rotation control device according to claim 1, wherein the rotating body is a complete spherical rotating body, a partial spherical rotating body or a virtual spherical rotating body with a plurality of local spherical surfaces.

8. The two-degree-of-freedom rotation control device according to claim 7, wherein the rotating body is a ceramic or metallic rotating body.

9. The two-degree-of-freedom rotation control device according to claim 1, wherein the fixing and supporting structure comprises:
a base having a spherical concaved seat for accommodating the rotating body;
a lower support member provided at a bottom of a spherical space of the spherical concaved seat, and configured to support the rotating body to allow the rotating body to have rotational degrees of freedom; and
an upper pressing block arranged on a top of the spherical concaved seat, and configured to hold the rotating body on the lower support member.

10. The two-degree-of-freedom rotation control device according to claim 9, wherein the upper pressing block is made from a solid lubricating material.

11. The two-degree-of-freedom rotation control device according to claim 9, wherein the linear driving end of each of the driving motors is in direct contact with the friction spherical surface of the rotating body on an equatorial plane or at a position of any horizontal section of the rotating body.

12. The two-degree-of-freedom rotation control device according to claim 9, wherein the lower support member is a lower support ring which has an annular band-shaped inner spherical surface configured to support the rotating body; alternatively, the lower support member comprises a plurality of support blocks distributed annularly and the support blocks have local inner spherical surfaces configured to support the rotating body.

13. The two-degree-of-freedom rotation control device according to claim 12, wherein the lower support ring or the support blocks are made from a solid lubricating material.

14. The two-degree-of-freedom rotation control device according to claim 9, wherein the spherical concaved seat is in a shape of an upwardly-opened hollow hemisphere, an outer side of the spherical concaved seat has a local plane surface, and grooves are opened in the local plane surface to form driving motor mounting positions, and a special shaped pillar is formed between the adjacent grooves, and the upper pressing block is mounted at a top of the special shaped pillar.

15. The two-degree-of-freedom rotation control device according to claim 1, wherein the linear driving end of each of the driving motors is in direct contact with the friction spherical surface of the rotating body on an equatorial plane or at a position of any horizontal section of the rotating body.

16. An application system, comprising a rotating device and a working unit on the rotating device, wherein the rotating device is the two-degree-of-freedom rotation control device according to claim 1, and the working unit is provided at the load mounting platform of the rotating body.

17. A two-degree-of-freedom rotation control device, comprising:
a rotating body having a friction spherical surface, wherein a load mounting platform is provided on a top of the rotating body or inside the rotating body;
a fixing and supporting structure configured to hold the rotating body, to allow the rotating body to have only rotational degrees of freedom; and
driving motors, wherein a driving end of each of the driving motors is in direct contact with the friction spherical surface of the rotating body, to allow the driving end and the rotating body to form a friction transmission pair tangent to the friction spherical surface; and
wherein there are two driving motors with a phase angle of 90 degrees, and each of the two driving motors is provided with a rotating support member at another side, opposed to the driving motor, of the rotating body.

18. The two-degree-of-freedom rotation control device according to claim 17, wherein the driving end of each of the driving motors is in direct contact with the friction spherical surface of the rotating body on an equatorial plane or at a position of any horizontal section of the rotating body.

19. The two-degree-of-freedom rotation control device according to claim 17, wherein each of the driving motors is a standing wave type piezoelectric ceramic motor.

20. The two-degree-of-freedom rotation control device according to claim 17, wherein each of the driving motors is arranged longitudinally at a periphery of the rotating body.

21. The two-degree-of-freedom rotation control device according to claim 17, further comprising:
a detection unit configured to acquire attitude data of the rotating body and transmit the attitude data to a control unit; and
the control unit configured to receive the attitude data measured by the detection unit and to control and adjust rotation of the rotating body in two rotational degrees of freedom according to data comprising the attitude data.

22. The two-degree-of-freedom rotation control device according to claim 17, wherein the rotating body is a complete spherical rotating body, a partial spherical rotating body or a virtual spherical rotating body with a plurality of local spherical surfaces.

23. The two-degree-of-freedom rotation control device according to claim 22, wherein the rotating body is a ceramic or metallic rotating body.

24. The two-degree-of-freedom rotation control device according to claim 17, wherein the fixing and supporting structure comprises:
a base having a spherical concaved seat for accommodating the rotating body;
a lower support member provided at a bottom of a spherical space of the spherical concaved seat, and configured to support the rotating body to allow the rotating body to have rotational degrees of freedom; and
an upper pressing block arranged on a top of the spherical concaved seat, and configured to hold the rotating body on the lower support member.

25. The two-degree-of-freedom rotation control device according to claim 24, wherein the lower support member is a lower support ring which has an annular band-shaped inner spherical surface configured to support the rotating body; alternatively, the lower support member comprises a plurality of support blocks distributed annularly and the support blocks have local inner spherical surfaces configured to support the rotating body.

26. The two-degree-of-freedom rotation control device according to claim 25, wherein the lower support ring or the support blocks are made from a solid lubricating material.

27. The two-degree-of-freedom rotation control device according to claim 24, wherein the upper pressing block is made from a solid lubricating material.

28. The two-degree-of-freedom rotation control device according to claim 24, wherein the spherical concaved seat is in a shape of an upwardly-opened hollow hemisphere, an outer side of the spherical concaved seat has a local plane surface, and grooves are opened in the local plane surface to form driving motor mounting positions, and a special shaped pillar is formed between the adjacent grooves, and the upper pressing block is mounted at a top of the special shaped pillar.

29. An application system, comprising a rotating device and a working unit on the rotating device, wherein the rotating device is the two-degree-of-freedom rotation control device according to claim 17, and the working unit is provided at the load mounting platform of the rotating body.

30. A two-degree-of-freedom rotation control device, comprising:
a rotating body having a friction spherical surface, wherein a load mounting platform is provided on a top of the rotating body or inside the rotating body;
a fixing and supporting structure configured to hold the rotating body, to allow the rotating body to have only rotational degrees of freedom; and
driving motors, wherein a driving end of each of the driving motors is in direct contact with the friction spherical surface of the rotating body, to allow the driving end and the rotating body to form a friction transmission pair tangent to the friction spherical surface; and
the fixing and supporting structure comprises:
a base having a spherical concaved seat for accommodating the rotating body;
a lower support member provided at a bottom of a spherical space of the spherical concaved seat, and configured to support the rotating body to allow the rotating body to have rotational degrees of freedom; and
an upper pressing block arranged on a top of the spherical concaved seat, and configured to hold the rotating body on the lower support member; and
wherein the lower support member is a lower support ring which has an annular band-shaped inner spherical surface configured to support the rotating body; alternatively, the lower support member comprises a plurality of support blocks distributed annularly and the support blocks have local inner spherical surfaces configured to support the rotating body.

31. The two-degree-of-freedom rotation control device according to claim 30, wherein the lower support ring or the support blocks are made from a solid lubricating material.

32. The two-degree-of-freedom rotation control device according to claim 30, wherein the driving end of each of the driving motors is in direct contact with the friction spherical surface of the rotating body on an equatorial plane or at a position of any horizontal section of the rotating body.

33. An application system, comprising a rotating device and a working unit on the rotating device, wherein the rotating device is the two-degree-of-freedom rotation control device according to claim 30, and the working unit is provided at the load mounting platform of the rotating body.

34. A two-degree-of-freedom rotation control device, comprising:
a rotating body having a friction spherical surface, wherein a load mounting platform is provided on a top of the rotating body or inside the rotating body;
a fixing and supporting structure configured to hold the rotating body, to allow the rotating body to have only rotational degrees of freedom; and
driving motors, wherein a driving end of each of the driving motors is in direct contact with the friction spherical surface of the rotating body, to allow the driving end and the rotating body to form a friction transmission pair tangent to the friction spherical surface; and
the fixing and supporting structure comprises:
a base having a spherical concaved seat for accommodating the rotating body;
a lower support member provided at a bottom of a spherical space of the spherical concaved seat, and configured to support the rotating body to allow the rotating body to have rotational degrees of freedom; and
an upper pressing block arranged on a top of the spherical concaved seat, and configured to hold the rotating body on the lower support member; and
wherein the spherical concaved seat is in a shape of an upwardly-opened hollow hemisphere, an outer side of the spherical concaved seat has a local plane surface, and grooves are opened in the local plane surface to form driving motor mounting positions, and a special shaped pillar is formed between the adjacent grooves, and the upper pressing block is mounted at a top of the special shaped pillar.

35. The two-degree-of-freedom rotation control device according to claim 34, wherein the driving end of each of the driving motors is in direct contact with the friction spherical surface of the rotating body on an equatorial plane or at a position of any horizontal section of the rotating body.

36. An application system, comprising a rotating device and a working unit on the rotating device, wherein the rotating device is the two-degree-of-freedom rotation control device according to claim 34, and the working unit is provided at the load mounting platform of the rotating body.

* * * * *